(12) United States Patent
Sarkar et al.

(10) Patent No.: US 8,495,169 B2
(45) Date of Patent: Jul. 23, 2013

(54) METHOD AND SYSTEM FOR MANAGING A HIERARCHICAL INFORMATION BASE WITH AN APPLICATION LAYER PROTOCOL

(75) Inventors: Sujoy Sarkar, West Bengal (IN); Robert Hyerle, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 12/264,273

(22) Filed: Nov. 4, 2008

(65) Prior Publication Data

US 2010/0077091 A1    Mar. 25, 2010

(30) Foreign Application Priority Data

Sep. 22, 2008  (IN) .......................... 2306/CHE/2008

(51) Int. Cl.
*G06F 15/16*   (2006.01)
(52) U.S. Cl.
USPC .......................................... 709/217; 707/705
(58) Field of Classification Search
USPC ... 709/201, 223, 224, 225, 226, 230; 370/254
See application file for complete search history.

(56) References Cited

U.S. PATENT DOCUMENTS

| | | | |
|---|---|---|---|
| 6,317,748 B1 * | 11/2001 | Menzies et al. ........................ | 1/1 |
| 2003/0208609 A1 | 11/2003 | Brusca | |
| 2005/0053016 A1 * | 3/2005 | Kawai et al. .................. | 370/254 |
| 2005/0080886 A1 | 4/2005 | Croy et al. | |

OTHER PUBLICATIONS

Mazumdar S: "Directory Enabled Management Information Base—Integration of MIB with Directories using cosnaming and JNDI" IFIP/IEEE International Workshop on Distributed Systems: Operations and Management, XX, XX, Aug. 25, 2000, pp. 1-32, XP002145963.

* cited by examiner

*Primary Examiner* — Scott Christensen

(57) ABSTRACT

Presented is a method and system for using the Simple Network Management Protocol, SNMP, to manage a hierarchical information base comprising a plurality of entries each defining one or more object attributes. The method comprises mapping each of a plurality of objects of an SNMP Management Information Base, MIB, to a unique attribute of the information base.

16 Claims, 1 Drawing Sheet

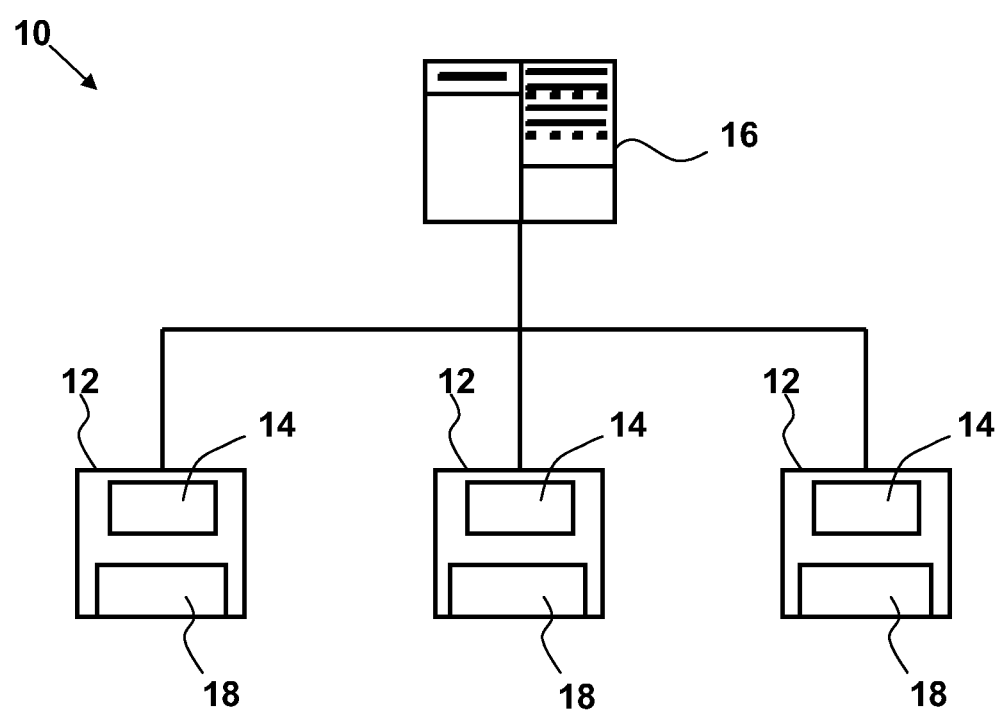

METHOD AND SYSTEM FOR MANAGING A HIERARCHICAL INFORMATION BASE WITH AN APPLICATION LAYER PROTOCOL

RELATED APPLICATIONS

Benefit is claimed under 35 U.S.C. 119(a)-(d) to Foreign application Ser No. 2306/CHE/2008 entitled "METHOD AND SYSTEM FOR MANAGING A HIERARCHICAL INFORMATION BASE WITH AN APPLICATION LAYER PROTOCOL" by Hewlett-Packard Development Company, L.P., filed on 22 Sep. 2008, which is herein incorporated in its entirety by reference for all purposes.

BACKGROUND

The Simple Network Management Protocol (SNMP) is a known application layer protocol that facilitates the exchange of management information between network devices.

SNMP is used in network management systems to monitor network-attached devices. It consists of a set of standards for network management, including an Application Layer protocol, a database schema, and a set of data objects.

Due to it's simplicity, SNMP has limitations with respect to information models and managed entity model descriptions. For example, SNMP has no notion of object behaviour, association or hierarchy in managed object descriptions.

BRIEF DESCRIPTION OF THE DRAWINGS

For a better understanding of the invention, embodiments will now be described, purely by way of example, with reference to the accompanying drawings, in which:

FIG. 1 is a schematic illustration of an SNMP-managed network employing an embodiment.

DETAILED DESCRIPTION OF THE INVENTION

Simple Network Management Protocol

Referring now to FIG. 1, an SNMP-managed network 10 consists of three key components: managed devices 12, agents 14, and one or more network-management systems (NMSs) 16.

A managed device 12 is a network node that contains an SNMP agent 14 and that resides on a managed network 10. Managed devices 12 collect and store management information and make this information available to a NMS 16 using SNMP. Managed devices 12, may sometimes be referred to as network elements, and can be routers and access servers, switches and bridges, hubs, computer hosts, or printers for example.

An agent 14 is a network-management software module that resides in a managed device 12. An agent 14 has local knowledge of management information and translates that information into a form compatible with SNMP.

An NMS 16 executes applications that monitor and control managed devices 12. NMSs typically provide the majority of processing and memory resources required for network management. One or more NMSs must exist on any managed network.

In essence, SNMP agents 14 expose management data on the managed devices 12 as variables. The managed devices are monitored and controlled using four basic SNMP commands: get, set, trap and traversal operations.

The get command is used by an NMS 16 to monitor managed devices 12. Using the get command, and NMS 16 examines different variables that are maintained by the managed devices 12.

The set command is used by an NMS 16 to control managed devices 12 since it enables the NMS 16 to change the values of variables stored within managed device 12.

The trap command is used by managed devices 12 to (asynchronously) report events to the NMS 16. For example, when certain types of events occur, a managed device 12 sends trap to the NMS.

Traversal operations are used by the NMS 16 to determine which variables a managed device 12 supports and to sequentially gather information in variable tables.

The variables accessible via SNMP are organized in hierarchies described by Management Information Bases (MIBs)

Each of the managed devices 12 in FIG. 1 comprises a MIB 18 which is a collection of information that is organized hierarchically in a (virtual) database. A MIB 18 is accessed using a network-management protocol such as SNMP and generally comprises managed objects identified by object identifiers (OIDs).

A managed object (sometimes called a MIB object, or an object) is one of any number of specific characteristics of a managed device 12. Managed objects typically consist of one or more object instances, which are essentially variables.

Two types of managed objects exist: scalar and tabular. Scalar objects define a single object instance, whereas tabular objects define multiple related object instances that are grouped in MIB tables. An example of a managed object is "atInput", which is a scalar object that contains a single object instance, the integer value that indicates the total number of input AppleTalk packets on a router interface.

An object identifier (or object ID) uniquely identifies a managed object in the MIB hierarchy. Structurally, an object ID consists of a node in a hierarchically-assigned namespace, formally defined using the ITU-T's ASN.1 standard.

The MIB hierarchy can be depicted as a tree with a nameless root, the levels of which are assigned by different organizations. Top-level MIB object IDs belong to different standards organizations, while lower-level object IDs are allocated by associated organizations. Vendors can define private branches that include managed objects for their own products. MIBs that have not been standardized typically are positioned in the experimental branch. Successive numbers of the nodes, starting at the root of the tree, identify each node in the tree. The root of the tree contains the following three "arcs": 0=ITU-T; 1=ISO; 2=joint-iso-itu-t. Thus, by way of example, the managed object "atInput" can be uniquely identified either by the object name—iso.identified-organization.dod.internet.private.enterprise.cisco.temporary_variables.Appletalk. atInput—or by the equivalent object descriptor, 1.3.6.1.4.1.9.3.3.1.

Lightweight Directory Access Protocol

The Lightweight Directory Access Protocol (LDAP) is an application layer protocol for querying and modifying directory services running over TCP/IP.

Conventional LDAP deployments tend to use Domain Name System (DNS) names for structuring the topmost levels of the hierarchy. Deeper inside the directory might appear entries representing people, organizational units, printers, documents, groups of people or anything else that represents a given tree entry (or multiple entries).

LDAP is defined in terms of ASN.1, and protocol messages are encoded in the binary format Basic Encoding Rules (BER). It uses textual representations for a number of ASN.1 fields/types, however.

The LDAP protocol accesses LDAP directories containing directory "entries". An entry consists of a set of attributes. An attribute has a name (an attribute type or attribute description) and one or more values. The attributes are defined in a schema. For example, when represented in LDAP Data Interchange Format (LDIF) (since LDAP is a binary protocol as mentioned above), an entry can look like:

dn: cn=John Doe,dc=example,dc=com
cn: John Doe
givenName: John
sn: Doe
telephoneNumber: +1 888 555 6789
telephoneNumber: +1 888 555 1232
mail: john@example.com
manager: cn=Barbara Doe,dc=example,dc=com
objectclass: inetOrgPerson
objectclass: organizationalPerson
objectclass: person
objectclass: top.

Each entry has a unique identifier referred to as its Distinguished Name (DN). A DN consists of its Relative Distinguished Name (RDN) constructed from some attribute(s) in the entry, followed by the parent entry's DN. Thus, a DN may be thought of as analogous to a full path to a file and the RDN as a relative filename in a folder.

So, for the example provided above, dn is the name of the entry. It is not an attribute nor part of the entry. "cn=John Doe" is the entry's RDN, and "dc=example,dc=com" is the DN of the parent entry, where dc denotes Domain Component. The other lines show the attributes in the entry.

According to an embodiment there is provided a method of using SNMP to manage a hierarchical information base comprising a plurality of entries each defining object attributes. The method comprises the step of mapping each of a plurality of objects of an SNMP MIB to a unique attribute of the information base, thereby establishing, for each of the plurality of objects, a correspondence with a unique attribute, and vice-versa.

Thus, SNMP MIBs may be defined for the SNMP "get", "set" and "trap" commands with respect to a LDAP directory service, for example.

In particular, embodiments enable mapping between SNMP MIBs and hierarchical information bases. By way of example, embodiments enable Distinguished Names (DNs) of an LDAP directory service to be mapped to and/or from object IDs in SNMP MIBs.

Furthermore, embodiments may allow the use of SNMP to view Information Models, such as OpenCall Information Models (OCIMs), which are similar to database schemas that describe the structure and content of data. Embodiments may also allow the use of SNMP to view instances of information models, an instance being a particular set of objects and attributes (for example, database contents).

It will therefore be appreciated that embodiments address the limitations of SNMP thereby enabling SNMP to be used for the management of hierarchical information bases. Embodiments may therefore be implemented in the SNMP-managed network of FIG. 1, for example in the NMS 16 and/or one or more of the managed devices 12.

In a preferred embodiment a function is adapted to undertake the translation between SNMP and LDAP object attributes based on the mapping definitions, and such a function resides in an NMS 16. The mapping definitions can be stored in the Information Model as part of a model instance or can be stored in some other form (XML, object-oriented language such as Java). If the mapping definition is not in same form as the information model, it may be preferable not to store it in the information model, but instead locate the mapping definition elsewhere in the managed network.

The mapping between DN's and OID's is based on what are hereinafter referred to as prototype DN's.

As explained above, DN's are composed of an RDN followed by the parent entry's DN, or alternatively, of a "left-hand-side" (lhs) and "right-hand-side" (rhs) pair. For example, a DN of "Instance=one;Application=myApp" has two classes: "Instance" and "Application". In an embodiment, these types are used to build a structure, hereinafter referred to as a prototype DN defining a part of the OID to which the DN will be mapped.

A prototype DN is a DN. It is referred to as a "prototype" because it defines a set of potential DN's. Prototype DN's are used as part of the mapping definition. They describe that each lhs (at the given position in the DN) in the DN's within a set will have an associated SNMP sub-objectID.

For example: a prototype DN of "Instance=2;Application=3" defines a set of possible DN instances in a given model instance (database) will have the form: "Instance=<value>;Application=<value>" and that an SNMP sub-sequence of OID values will be "... 3.2 ..." This can then be combined with a prefix OID segment that is typically fixed for a given situation (i.e. the standard SNMP prefix, the vendor ID, etc, 1.3 ... 3.2). This objectID segment identifies an object type from which scalar or columnar data could be further indicated.

At each level in the prototype DN (e.g. at "Application=3") there is an associated object with attributes. It is this object that completes a mapping giving the index mapping method, the default value (described below).

When two prototype DN's share the same path from the root of the information model, they need to be disambiguated. Continuing the above example, suppose there is a prototype DN "Engine=10;Instance=2;Application=4" yielding an OID segment of "4.2.10". After traversing "4.2.x", it would be unclear if this refers to a scalar value in "Instance" or an object type for "Engine".

To avoid looking forward in OID strings and, in particular when indexing is introduced, it is required that the OID be unambiguous at every step of the traversal of sub-identifiers. The proposed solution for this example is to ensure that the OID sub-identifiers for all of "Instance's" descendants be distinct.

Descendants of a particular RDN are defined as child RDN types (lhs) and the attributes (scalars/columars) within the object attached to the RDN. B To further explain, a pair of unambiguous prototype DN's is as follows:

Instance=1;Application=4
Engine=10;Instance=1;Application=4

In proposed embodiments, only a single OID may map to a given instance DN and only a single OID sub-sequence may map to a given prototype DN.

These prototype DNs described above are stored as part of the information model stored in a management server such as an information model management service (IMMS). It should also be appreciated, however, that the prototype DNs could be stored in another format in other locations (for example, in the filesystem, embedded in the mapping/gateway code, or at the web server, etc.).

Hence, whilst, in embodiments, they are referred to as "prototype DNs", they are viewed externally as DN's referring to object instances. The instances are used to define the mapping between SNMP scalar objects and information model object attributes within a given class. Such mapping from an SNMP object to information model attributes may be defined by a class definition "SNMPMap" as follows:

className—(string)—the name of the Information model class definition for objects attached at a DN "type". This may be redundant with some information Model descriptions.

isIndexed—(Boolean)—true if the RDN is indexed.

singletonvalue—(string)—expected RDN value (rhs) if the definition is a singleton (i.e. not indexed)

attributeNames [MULTI_VALUE]—(string)—list of attributes within className that are defined within the MIB attributeIds [MULTI_VALUE]—(integer)—list of OID sub-identifiers corresponding to the attributeNames defaultattribute [OPTIONAL]—(string)—attribute to use when translating a DN to an OID and no explicit attribute is provided keys [MULTI_VALUE]—(string)—list of attributes within className used to compose the SNMP index mapper [OPTIONAL]—(string)—name of a method that maps RDN's/instances of this node to OID index subsequences Therefore, continuing with the above example again, the "Engine" object type might be defined as:

className: "EnginePerf"
    attributeNames: "speed" "temp" "state"
    attributeIds: 1, 2, 3

Disregarding indexing which is described below, the OID for engine temperature would be " . . . 4.1.10.2.0" Note the trailing zero is SNMP convention to indicate a scalar value.

From this description, it will be understood that an MIB's definition files can be generated by hand or automatically. Also, given an information model description, a MIB object type mapping description can be constructed by hand or automatically.

The prefix OID segment can be defined as an attribute in the SNMPEnv class as follows:

OIDPrefix—(string)—the prefix of all OID's within the implementation.

In summary, an OID is comprised of four sequences of sub-identifiers:

Prefix—fixed for a given implementation and comprised of sub-ids normally starting from iso (1), org (3), dod (6), internet (1), private (4), enterprises (1), . . .

Type—a sequence of sub-ids derived from the Left-Hand Side (lhs) of the DNs. There is a one to one correspondence between a given lhs and a sub-id.

Attribute—a single sub-id that is either a singleton or a column in a table. If the attribute is a column, then the above type sequence has an additional sub-id or "1" appended to it. This corresponds to the SNMP convention of defining a table "Entry" for each table type. This implies that no "type" sub-id should have a value of "1" if its parent type has an associated table.

Index—a sequence of sub-ids derived from the index computations ("mapper") performed at each RDN along a given DN. The index has zero sub-ids when the RDN is not indexed.

Mapping Using RDN Right-Hand Sides (RHSs)

Given that the mapping to object type has been detailed, it now remains to define how the correspondence between OID's and DN's/attributes is made for a particular instance of an information model. From the example above, it is possible that a model instance would include the following object instance DNs:

Instance=one;Application=myApp
    Instance=one;Application=theirApp
    Instance=twelve;Application=theirApp
    Engine=v8;Instance=one;Application=myApp
    Engine=v6;Instance=one;Application=myApp Here, there are three (leaf) object classes: one each for Instance, Engine, and Application. There are two instances of Application (myApp and theirApp); three instances of Instance (myApp/one, theirApp/one, theirApp/twelve); and two instances for Engine (v8, v6). The "values" (or "right-hand-sides" rhs) of the RDN's can be used as indexes to the correct SNMP object instance. Notationally, the reference to the temperature of the v8 engine is " . . . 4.1.10.2.(myApp).(one).(v8)".

There are methods of "expanding" the values of non-integers such as strings and IP addresses into a sequence of sub-identifiers. The default method of mapping an RDN rhs is to treat it as a variable string and encode it as a length followed by the character codes. If the mapper attribute is not defined, this default is used. However, this is often undesirable.

Thus, to address the problematic use of the default mapping of indexes into OID sub-identifiers, the mapper attribute in the SNMPMap class definition specifies an alternate mapping function to use. One such mapper function will treat RDN rhs as integer values to be used as the index.

It may be the case that a given RDN within a prototype DN will always have exactly one instance: a singleton. In this case, indexing is not needed and only the correspondence between the RDN lhs and an OID sub-identifier is used. This is indicated by isIndexed being false and the expected value of a singleton's rhs is given by the singletonvalue attribute. There should never be more than one rhs for such RDN's Mapping Using Attribute Values A mapper function can be based on a sequence of attribute values within the object instance itself (a key) rather than on the RDN right-hand-side. Just as RDN's distinguish individual object instances, so must the keys. Further, such keys should typically remain stable over the life of the object instance: i.e. write once.

The sequence of attributes used for a key can be specified in a SNMPMap class definition as follows:

keys [MULTI_VALUE]—(string)—list of attributes within className used to compose the SNMP index.

Using such a definition, a specified mapper function can map attribute values to an OID sub-sequence representing the indexes.

DN/OID Translation

A DN plus attribute name presented to an SNMP gateway (or some other application) at runtime for translation to an OID has either pre-loaded the SNMP prototype model or uses the model on demand. For each type (lhs) in the DN, the gateway is adapted to find the corresponding OID sub-identifier. The gateway also stores in memory the value (rhs) of each RDN element for use in forming the index. The mapper, if present, is then obtained. This process continues until the end of the DN.

If an attribute name is not provided, a pre-defined default attribute name—may be used.

After constructing this part of the OID, the named attribute's subidentifier is retrieved from attributeIds.

For each RDN that is indexed, the OID subidentifier sequence is obtained using the appropriate mapper function. For example:

a default string mapper using the rhs of the RDN is employed when the mapper attribute is set to "default" or not defined;
    an integer mapper using the rhs of the RDN is employed when the mapper attribute is set to "intRhs"; and
    an attribute mapper using a sequence of attribute values is employed when the mapper attribute set to "attrs".

It is noted that when using the RDN rhs, the information model does not have to be accessed because the computation can be completed using only the DN. However, when the mapping is based on attribute values, the information model is accessed and the attribute values retrieved (for each RDN with this type of mapping).

For the reverse mapping, from OID to DN plus attribute, the SNMP gateway is arranged to: 1. Parse and remove global prefixes; 2. Using a mapping derived from the SNMP prototype description, recover the DN type names from the OID sub-identifiers (this process continues until a scalar/columar is found); 3. At each point during the traversal of the OID, memorise the mapper if it is present (i.e. isIndexed); 4. Use the OID subidentifier corresponding to a scalar/columnar to recover the attribute name using attributeIds and attributeNames; and 5. Using either the default or explicitly defined mappers, parse the indexes and convert to DN values. These values are used to "fill out" the DN.

When the mapping is based on attribute values, the SNMP gateway is adapted to lookup the object instance having the sequence of attribute values corresponding to the OID subidentifier sequence. Only then can it obtain the RND rhs. The mapper function performs this match and/or provides the OID sub-sequence to attribute value sequence.

Again, when the mapping is based on attribute values, the information model is accessed and the object instance name retrieved (for each RDN with this type of mapping).

OID Clipping and Default Attribute Mapping—"Sets"

DN's and OID's are complete or "full" names. Often the more "global" or significant part of the name may be known by the context and/or a relative name is desired. In SNMP, the "type" and global prefix may be known and only the index values are needed to identify an instance. In the mapping of DN's to OID's for "on the fly" translation for "get", "set", and "trap" operations, one can indicate that the value of the OID is, or should be, "clipped." That is, only the sequence of index values is provided by the management system (for "set"). Similarly, the value returned to the management system (for "get" and "trap") will be only the sequence of index values.

Defining Trap MIB's

The definition of SNMP trap MIB's is currently not stored in the IMMS, but in the SNMP gateway. At present, only some mapping information is represented in the IMMS.

Trap MIB's contain only information that can be derived from the SAF notification. MIB's themselves must be defined as well as the mapping between SAF notifications and the MIB. The mapping between SAF Notification Class Identifiers (NCI's) and SNMP trap MIB names is stored in the IMMS and is described below.

The "notification object" and "notifying object" present in the SAF notification are DN's. These are converted to OID's as per the above mapping definitions such that an SNMP manager can interrogate them. However, a DN alone does not specify a valid OID: an attribute must also be specified (OID's must, after parsing and indexing result in a reference to a simple type). The SAF notification does not contain an attribute name. Hence, the definition of the MIB provided to the gateway or in the information model defined mapping must specify the attribute that is used to obtain a valid OID. This attribute is translated to the sub-identifier of the scalar or columnar within the OID (which occurs prior to the index portion of the OID). This must be done for all DN's that are mapped to OID's for inclusion in the trap. However, this is not required if the OID is clipped as only the index portion of the OID is returned.

It is highly desirable that these attributes indicate the alarm state or other state (for alarm and state change notifications).

The NCI, if present, in a notification is used to access the IMMS mapping. If it is not present or not defined, default trap MIB's for alarm and state change are used. The NCI is composed of three integer values:
vendor id
major id
minor id The information model server contains a sub-model that selects a particular notification definition:
"MinorID=k;MajorID=j;VendorID=i"
where "i, j, k" are integer values. The objects in the DN hierarchy at the "VendorID" and "MajorID" level do not contain any information except the key values used in the look up: that is, the values "i" and "j" respectively. These keys can be found using the DN names or, for convenience, as attribute values: named "id".

For example, the following attributes can be defined in a NotificationMap class definition:
MIBOID—(string)—the OID of the SNMP MIB definition to use when translating this notification. The OID is relative to a global prefix that is defined within SNMPEnv ("OIDPrefix")
trimNotification—(Boolean)—true if only the index portion of the notification object OID should be included in the trap
trimNotifying—(Boolean)—true if only the index portion of the notifying object OID should be included in the trap
notificationAttr—(string)—used along with the mapped notification object DN to form a valid OID. Only necessary if no triming is done.
notifyingAttr—(string)—used along with the mapped notification object DN to form a valid OID. Only necessary if no triming is done.
id—(integer)—the MinorID value of this NotificationMap instance Mapping SAF Notifications to SNMP Traps (Req. 14)

The selection of trap MIB is based firstly on SAF "Event Type" which is a mandatory parameter. However, this is very generic and should only be used as a "fallback" mapping. In general, the "Notification Class Identifier" should be used to select the correct trap MIB. All X.73x mandatory parameters should be included in the trap and mappings need to be defined (for alarms and state changes) for:
event type
notification object DN
notifying object DN (default is notification object)
event time
event ID
probable cause
perceived severity
correlated event ID's
changed state attribute list
changed state attribute id, value

EXAMPLE

The following examples are written in the Information Model Management Service (IMMS) native model description.

1. Below is an example of a hierarchically structured (LDAP) information base where there are six classes. From the root level, instances of these types appear as:
OcSacAppT
  OcSacSubscriberGroupT
  OcSacCallStatisticsT
  OcSacTelecomOperatorT
    OcSacTelecomNetworkT
OcSacCountryT Thus, it will be appreciated that instances of OcSacCountryT have no descendants in the LDAP tree, OcSacAppT instances have three types of direct descendants, and OcSacTelecomOperatorT instances have one type of direct descendant.

2. According to an embodiment, mapping the above LDAP information base to an SNMP representation, where all six of the above classes along with their LDAP structure are mapped, is as follows:

OcSacAp—Has a type sub-id of "3" and is indexed on the appId attribute.

OcScaSubscriberGroup—A type sub-id of "2" and is indexed on subscriberGroupid attribute.

OcSacCallStatistics—A type sub-id of "3" and is indexed on subscriberGroupid attribute OcSacTelecomOperator—A type sub-id of "4" and is indexed on operatorId attribute.

OcSacTelecomNetwork—A type sub-id of "3" and is indexed on an integer RDN right-hand side.

OcSacCountryT—A type sub-id of "2" and is indexed using a variable length string (default mapping)

The global environment defines an OID prefix value of "1.3.6.1.4.1.11.2", and a single trap is defined as follows:

Overload—Has a trap mid OID of "1.3.6.1.4.1.11.2.100.4.13" (prefix+MIB OID) and is mapped to an NCI of (44,10,13) (vendorId,majorId,minorId).

3. The classes defined in the information model for providing SNMP mapping are provided in a single file: snmp_classes.sf 4. The complete model of the six OcSac classes along with some sample instances are provided in a single file: OCSAC_all.sf 5. The complete LDAP information base of the SNMP mappings for the example is defined in a single file: SNMP_all.sf. Thus, this single file contains the class definitions for an SNMP to IMMS mapping (snmp_classes.sf), and the model structure describing the hierarchy of the information (OCSAC_all.sf). Such a file can be loaded by the IMMS and become part of its contents (they are transformed into an internal format and so may not be directly stored as files in the IMMS). The IMMS, in turn, resides in one or more SNMP agents. Alternatively, the file can be represented in Java, XML, or any suitable object-oriented language, and stored any stored at any suitable place(s) in a managed network.

6. Finally, the joint model: example definitions, example instances, and snmp mapping is provided in a single file: joint_all.sf Some of the advantages provided by embodiments may be summarized as follows:

A one-to-one correspondence between a DN prototype and a MIB definition can be established. This correspondence can be independent of any particular instantiation of an information model. That is, Instance DN's (except for singletons) are not given pre-defined mappings: they are distinguished via their right-hand-side values. The MIB definition is comprised of both the definition of attributes as well as the object ID prefix (prior to any indexing).

It is possible (at runtime) to make a translation between a given DN and a MIB table row and vice-versa. From either the MIB table row or the DN, a given attribute can be indicated. Such an indication of an attribute is static (does not depend on index values/RDN values) and local to the object/row indicated by the DN/Object ID.

A default mapping of variable length strings in RDN "right-hand-side's" (rhs) to an index value is provided.

Embodiments also provide for a mapping using integer values in RDN rhs's. The use of this mapping instead of a default is indicated by the definition of the information model/MIB.

An integer typed attribute within an object may be used as an index value instead of using the RDN rhs. Similarly, multiple integer typed variables within an object may be used as multiple indices instead of the RDN rhs.

For SNMP "get" and "trap" commands, it is possible to map information model attribute values of type "SANAMET" (SAF Name Type) to one of: a complete object ID; or the portion of the object ID corresponding to the indices.

The Information Model to SNMP mapping may be stored outside of the Information Model Management System (IMMS), so as to reduce hardware requirements and/or avoid "clutter".

Embodiments enable the definition of the mapping from the prototype of the DN of notification object plus the notification type to a trap MIB. Furthermore, it is possible to map the DN's of notification object and notifying object to either complete OID's or the index portion of the OID's.

Embodiments also enable an IMMS to SNMP mapping for only a subset of the IMMS model.

Embodiments not only allow hierarchy in an information model description but also inherently map associations of related LDAP or SAF Name Type using the only available complex data structure in SNMP, MIB Tables.

Instead of having little MIB's in each of the managed network elements, embodiments have a dedicated, centralized server that can take some of the load off the managed elements and provide a single point of contact for the NMS (which is a client of the SNMP gateway). This may provide performance advantages for the total network management solution.

While specific embodiments have been described herein for purposes of illustration, various other modifications will be apparent to a person skilled in the art and may be made without departing from the scope of the invention.

The invention claimed is:

1. A method of using a Simple Network Management Protocol, SNMP, to manage a Lightweight Directory Access Protocol, LDAP, information base comprising a plurality of entries each defining one or more information model object attributes, the method comprising:

providing, at a network management system of an SNMP managed network, a mapping definition; and mapping, at runtime by the network management system using the mapping definition, between each of a plurality of objects of an SNMP Management Information Base, MIB, and a corresponding unique attribute of the LDAP information base, wherein a particular one of the plurality of objects includes an Object Identifier (OID), wherein the mapping includes mapping between the OID of the particular object and an LDAP Distinguished Name, DN, instance, and wherein the mapping definition includes a data structure that includes elements of the DN instance, and the data structure maps the elements of the DN instance to corresponding sub-sequences of the OID.

2. The method according to claim 1, further comprising:
defining the mapping definition in an eXtensible Markup Language, XML, or object oriented language.

3. The method according to claim 1, wherein the mapping definition comprises information relating to class definitions for the mapping, and a description of an information model structure.

4. The method according to claim 1, wherein the LDAP information base is implemented on an Information Model Management System, IMMS.

5. The method according to claim 1, wherein the data structure is a prototype DN that defines a set of DN instances, wherein each of the DN instances in the set has the elements of the prototype DN assigned to corresponding different groups of values for respective ones of the DN instances in the set.

6. The method according to claim 5, wherein the OID includes a string that is a concatenation of the sub-sequences.

7. A Simple Network Management Protocol, SNMP, network management system comprising:
  a memory to store a mapping definition between SNMP attributes and attributes of a Lightweight Directory Access Protocol, LDAP, information base; and
  at least one processor configured to:
    monitor and control a plurality of managed devices in an SNMP network;
    manage the LDAP information base comprising a plurality of entries each defining one or more object attributes; and
    map, at runtime, between each of a plurality of objects of an SNMP Management Information Base, MIB, and a corresponding unique attribute of the LDAP information base, wherein a particular one of the plurality of objects includes an Object Identifier (OID), wherein the mapping includes mapping between the OID of the particular object and an LDAP Distinguished Name, DN, instance, and wherein the mapping is based on a mapping definition that includes a data structure having elements of the DN instance, and the data structure maps the elements of the DN instance to corresponding sub-sequences of the OID.

8. The SNMP network management system according to claim 7, wherein the LDAP information base is implemented on an Information Model Management System, IMMS.

9. The SNMP network management system according to claim 7, wherein the mapping definition is in an eXtensible Markup Language, XML.

10. The SNMP network management system according to claim 7, wherein the data structure is a prototype DN that defines a set of DN instances, wherein each of the DN instances in the set has the elements of the prototype DN assigned to corresponding different groups of values for respective ones of the DN instances in the set.

11. A non-transitory computer-readable storage medium having instructions that, when executed by a computing device, cause the computing device to:
  provide, at a network management system, a mapping definition; and
  map, at runtime by the network management system using the mapping definition, between each of a plurality of objects of an SNMP Management Information Base, MIB, and a corresponding unique attribute of a Lightweight Directory Access Protocol, LDAP, information base,
  wherein a particular one of the plurality of objects includes an Object Identifier (OID), wherein the mapping includes mapping between the OID of the particular object and an LDAP Distinguished Name, DN, instance, and wherein the mapping definition includes a data structure that includes elements of the DN instance, and the data structure maps the elements of the DN instance to corresponding sub-sequences of the OID.

12. The non-transitory computer-readable storage medium according to claim 11, wherein the instructions when executed cause the computing device to further:
  define the mapping definition in an eXtensible Markup Language, XML.

13. The non-transitory computer-readable storage medium according to claim 11, wherein the mapping definition comprises information relating to class definitions for the mapping, and a description of an information model structure.

14. The non-transitory computer-readable storage medium according to claim 11, wherein the LDAP information base is implemented on an Information Model Management System, IMMS.

15. The non-transitory computer-readable storage medium according to claim 11, wherein the data structure is a prototype DN that defines a set of DN instances, wherein each of the DN instances in the set has the elements of the prototype DN assigned to corresponding different groups of values for respective ones of the DN instances in the set.

16. The non-transitory computer-readable storage medium according to claim 15, wherein the OID includes a string that is a concatenation of the sub-sequences.

* * * * *